Figure 1:
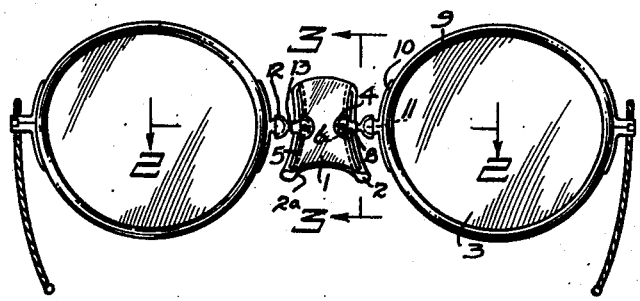

June 2, 1953 — E. H. MOSELEY — 2,640,391
EYEGLASS MOUNTING
Filed July 2, 1949

INVENTOR.
ERNST H. MOSELEY
BY
*Gerald F. Baldwin*
ATTORNEY

Patented June 2, 1953

2,640,391

UNITED STATES PATENT OFFICE 2,640,391

EYEGLASS MOUNTING

Ernst H. Moseley, Detroit, Mich.

Application July 2, 1949, Serial No. 102,730

3 Claims. (Cl. 88—42)

This invention relates to improvements in eye glass mountings, and is a continuation in part of my application Serial No. 707,301, filed November 1, 1946, for Optical Mountings, now Patent No. 2,474,856, issued July 5, 1949.

At the present time it is customary to make eye glass mountings including a bridge or nose piece which is relatively narrow, and means integral therewith and extending laterally from each side thereof for supporting a lens. Consequently in order to obtain correct positioning of each lens it is customary to bend or twist each lens support means intermediately of its length to bring the lens carried thereby into its proper position. To obtain proper vision the lenses must not only be in axial alignment with the wearer's eyes but must also be properly spaced therefrom, and at the same time the vertical axes of the lenses must be maintained. However when the intermediate support portions are bent or twisted to correct the positioning of the lenses it often happens that one set of errors has been remedied merely at the expense of other errors.

It is an object of this invention to provide an eye glass mounting wherein provision is made for easily and accurately making any and all adjustments which may be found necessary in setting the lenses in position.

Another object of the invention is to provide an eye glass mounting comprising universal setting means interposed between the bridge and each lens support including telescopic means for setting the distance of each lens from the bridge, and ball and socket connections at both ends of the telescopic means so that each lens may be readily set both in vertical and axial alignment with the eye and the proper distance therefrom.

A further object of the invention is to provide an eye glass mounting including a relatively large and wide bridge, or nose piece, made of transparent material and having ample bearing surface of somewhat convex shape extending longitudinally and intermediately of its width to seat upon a wearer's nose, and also having its opposite sides inwardly curved toward the face of the wearer and being longitudinally somewhat convex to provide lateral support to prevent accidental displacement. By thus utilizing a relatively large bridge not only is ample room afforded for secure attachment toward opposite sides thereof of the universal setting means for the lenses, but sufficient bearing area is also provided to insure the bridge resting comfortably upon the nose without fear of its displacement thereon.

Having thus stated some of the objects and advantages of the invention I will now describe the invention in detail with the aid of the accompanying drawing, in which:

Figure 1 is a front elevation of the invention showing the lenses mounted in conventional rims.

Figure 2:
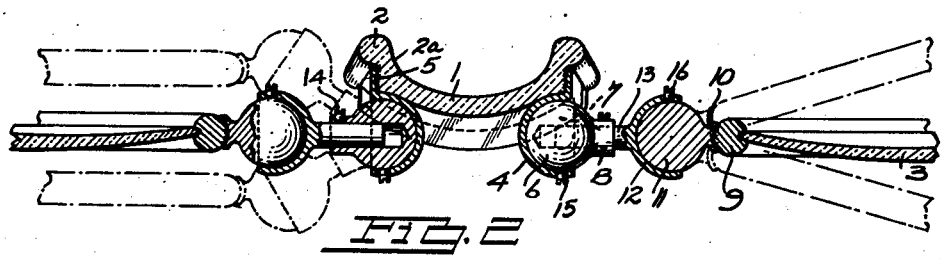
Figure 3:
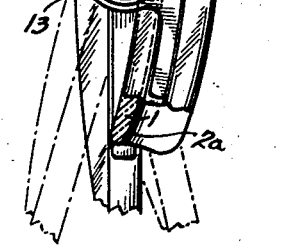

Figures 2 and 3 are enlarged sections on the lines 2—2 and 3—3 respectively of Figure 1.

Figure 4:
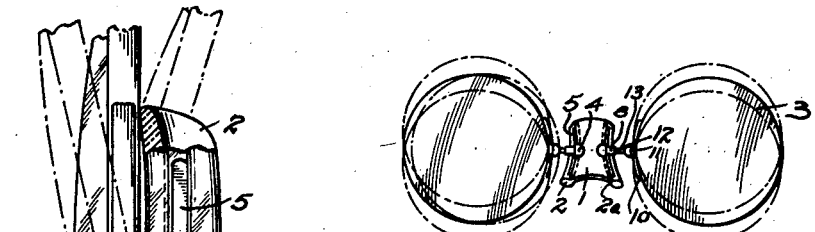
Figure 5:
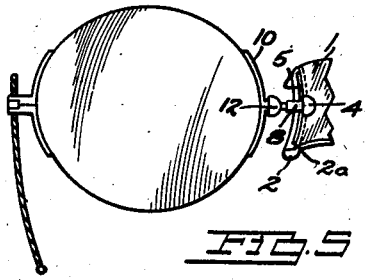

Figure 4 is a slightly modified view showing the invention applied to rimless lenses, and Figure 5 is an enlarged partial view of Figure 4.

Referring to the drawing, 1 designates a bridge, or nose piece, made preferably of colorless transparent material, such as break-resisting glass. This bridge, which is relatively large, is long enough to extend some little distance downward over a wearer's nose, and intermediately of its width it is longitudinally convex to seat in the concavity usually found in the human nose. Integral with the bridge 1 and forming part thereof on opposite sides are relatively shallow flanges 2 extending longitudinally and toward the wearer's face to prevent accidental lateral displacement of the bridge. Thus while the bridge is of marked length and width, due to its being made of clear glass, it is inconspicuous; and due to its rounded formation at top and bottom and the ample radii 2a between the flanges 2 and the adjacent inner side of the bridge itself ample supporting area is provided which rests easily and comfortably upon the nose without any tendency to cause discomfort.

For the sake of clarity the lens holding means extending from the bridge 1 for carrying the lenses 3 have been very considerably exaggerated as to size, so that the spacing of the lenses appears too great in proportion to the size of the bridge.

Secured, usually adhesively, to the bridge 1 intermediately of its height and toward opposite sides thereof are sockets 4 having laterally projecting flanges 5 which rest against vertical faces 2b formed on the outer sides of the flanges 2 to which they are secured, usually by a suitable adhesive. The interiors of the sockets 4 are generally somewhat more than hemispherical and are somewhat resilient to permit the insertion or removal of a ball 6 which is swivelly mounted in each socket. Formed through each ball 6 from one side is a radial opening 7 which extends past the ball axis, and made integral with each ball is an annular flange 8 which projects therefrom around and concentric with its opening 7.

Suitably secured, usually by an adhesive, to rims 9 in which the lenses 3 are mounted as shown in Figures 1 and 2, or directly to the lenses themselves as shown in Figures 4 and 5, are projections or flange members 10 integral with balls 11. Swivelly mounted upon the latter are sockets 12 the interior of each of which is somewhat more than hemispherical; moreover the sockets are sufficiently resilient to permit insertion of the balls thereinto. Projecting radially outward from the sockets and integral with the latter are pins 13 one of which is inserted into each of the openings 7. As soon as the distance between the bridge 1 and the lenses 3 has been established set screws 14 in threaded engagement with the flanges 8 and extending radially therethrough are tightened to grip the pins 13 and thus maintain fixed spacing between the axes of the balls 6 and 11. As may be readily seen from Figure 2, both vertical adjustment of the lenses 3 and their spacing from the face of the wearer may be quickly set by adjusting the balls 6 in the sockets 4 and the sockets 12 about the balls 11, after which each cooperating ball and socket is secured to one another to prevent accidental relative movement. In the present instance this is accomplished by providing set screws 15 and 16 in the sockets 6 and 12 to engage the periphery of the balls 4 and 11 respectively.

While in the foregoing the preferred embodiment of the invention is described and shown it is understood that the invention is susceptible to such alterations and modifications to fall within the scope of the appended claims.

What I claim is:

1. In an eye glass mounting including a bridge and lens mounts adapted to be connected to the bridge for universal adjustment, a pair of ball sockets affixed to said bridge and arranged one at each side thereof, a ball movably mounted in each socket, said ball being provided with a radial opening, a second ball socket having a pin adapted to be received in said opening of each of said balls, a ball in each of said second sockets rigidly secured to one of said lens mounts, releasable threaded fasteners carried by said sockets for locking the corresponding balls against movement, and releasable threaded fasteners for securing said pins in said openings in a preselected position.

2. In an eye glass mounting including a bridge and a pair of lens mounts adapted to be connected to the bridge for universal adjustment, a pair of ball sockets one fixedly secured on each side of the bridge, a ball swivelly mounted in each socket and having a radial opening therein, a ball fixedly mounted on each lens mount, a ball socket swivelly mounted on each of the last named balls, a pin integral with and extending radially outward from each of the last named ball sockets and mounted for movement in one of said openings, whereby, by movement of the balls in their respective sockets the lens mounts may be universally adjusted relative to one another and to the bridge, and by movement of the pins in the ball openings the spacing of the mounts from the bridge and from one another may be adjusted, releasable means cooperating with each apertured ball for holding each pin immovable in its opening, and releasable means coacting with each socket for holding each ball immovable in its socket.

3. In an eye glass mounting including a bridge and a pair of lens mounts adapted to be connected to the bridge for universal adjustment, a pair of ball sockets one fixedly secured on each side of the bridge, a ball swivelly mounted in each socket and having an opening therein, a ball fixedly mounted on each lens mount, a ball socket swivelly mounted on each of the last named balls, a pin integral with and extending outwardly from each of the last named ball sockets and mounted for movement in one of said openings, whereby, by movement of the balls in their respective sockets the lens mounts may be universally adjusted relative to one another and to the bridge, and by movement of the pins in the ball openings the spacing of the mounts from the bridge and from one another may be adjusted, releasable means cooperating with each apertured ball for holding each pin immovable in its opening, and releasable means coacting with each socket for holding each ball immovable in its socket.

ERNST H. MOSELEY.

References Cited in the file of this patent

UNITED STATES PATENTS

| Number | Name | Date |
|---|---|---|
| 77,287 | Hunter | Apr. 28, 1868 |
| 255,530 | Peckham | Mar. 28, 1882 |
| 440,064 | Schreiber | Nov. 4, 1890 |
| 862,124 | Allen | Aug. 6, 1907 |
| 1,619,367 | Peterson | Mar. 1, 1927 |
| 1,838,646 | Walsh | Dec. 29, 1931 |
| 1,968,143 | Halikman | July 31, 1934 |
| 2,080,503 | Peterson | May 18, 1937 |
| 2,317,873 | Alger | Apr. 27, 1943 |
| 2,474,856 | Moseley | July 5, 1949 |

FOREIGN PATENTS

| Number | Country | Date |
|---|---|---|
| 588,075 | France | Apr. 29, 1925 |